March 30, 1948.  H. H. WEISS ET AL  2,438,590
HOP SEPARATOR
Filed May 8, 1946  2 Sheets-Sheet 2
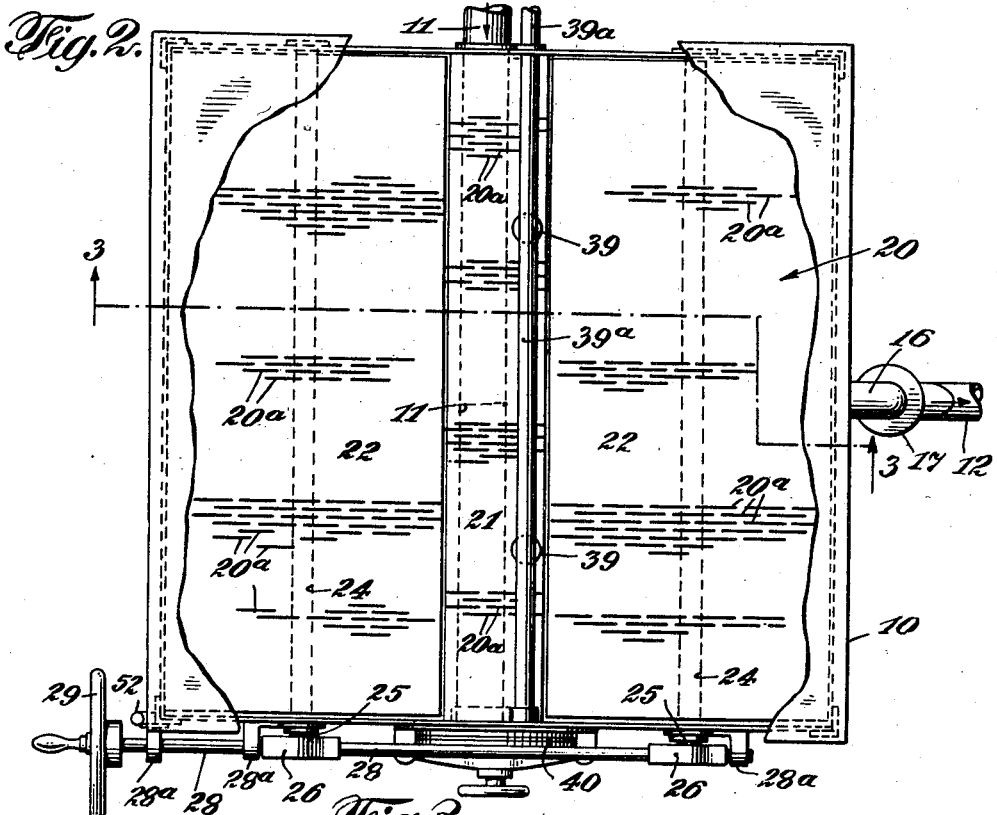
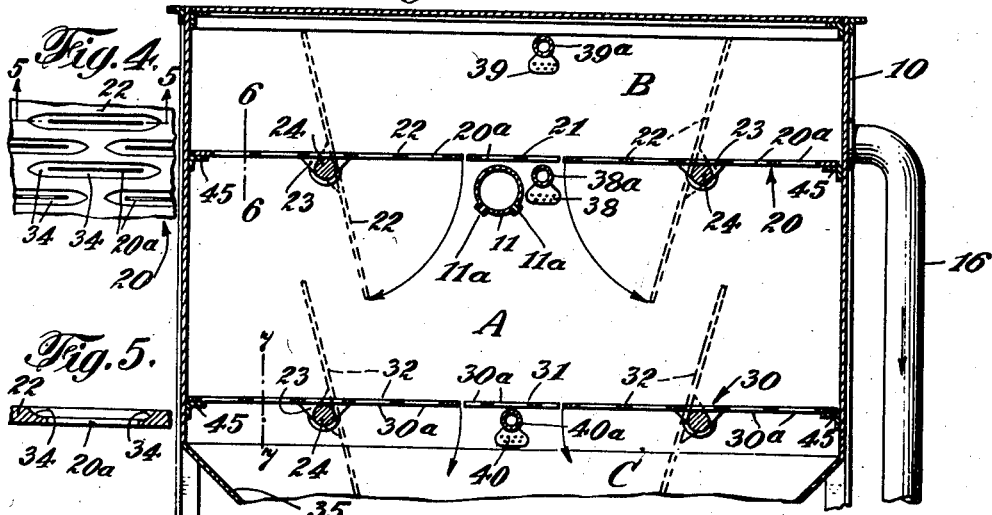
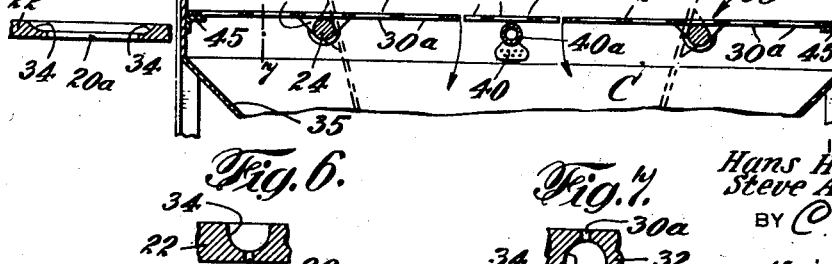
INVENTORS
Hans H. Weiss and
Steve A. Tabacchi
BY C. P. Goepel
their ATTORNEY Patented Mar. 30, 1948

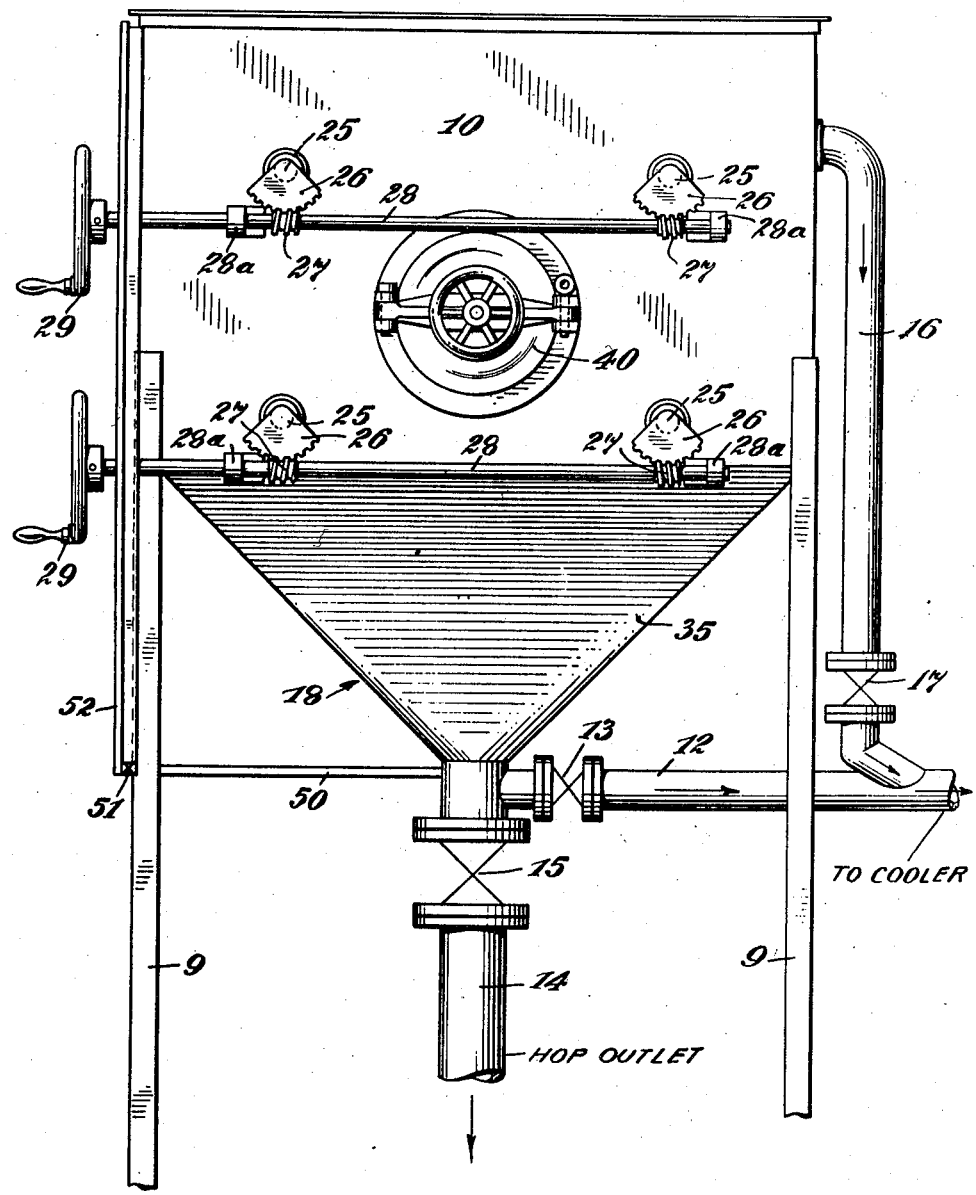

2,438,590

UNITED STATES PATENT OFFICE 2,438,590

HOP SEPARATOR

Hans H. Weiss and Steve A. Tabacchi, Seattle, Wash., assignors to Schock, Gusmer & Co., Inc., Hoboken, N. J., a corporation of New Jersey Application May 8, 1946, Serial No. 668,234

1 Claim. (Cl. 210—149)

This invention relates to a hop separator or hop jack.

The object of the invention is to improve separation of the wort from the hops.

The invention consists of a tank having two vertically spaced false bottoms, each having a stationary part and one or more tiltable parts, and having a plurality of orifices. A wort supply is arranged preferably below the stationary part of the upper false bottom, and discharge pipes are provided for the clear overflow wort and for the remaining wort and hops.

The orifices of the slots of the false bottoms are preferably elongated and terminate from countersunk portions circumferentially surrounding the orifice slots.

The invention will be more fully described hereinafter, embodiments thereof shown in the drawings, and the invention will be finally pointed out in the claim.

In the accompanying drawings,

Fig. 1 is a side view of the improved hop separator;

Fig. 2 is a top view with the cover broken away;

Fig. 3 is a vertical section taken on line 3—3 of Fig. 2;

Fig. 4 is a partial top view of the false bottom;

Fig. 5 is a section taken on line 5—5 of Fig. 4;

Fig. 6 is a vertical section on line 6—6 of Fig. 3; and

Fig. 7 is a vertical section taken on line 7—7 of Fig. 3.

Similar characters of reference indicate corresponding parts throughout the various views.

Referring to the drawings, the hop jack consists of a tank 10 which may have square sides, top and cone bottom. The tank 10 in plan may be either square or rectangular, depending on the installation requirements. The height depends on the capacity required, but can be held to a minimum due to the large filtering area provided by the improvements.

The tank 10 is suitably supported by standards 9, and is supplied by a wort inlet 11. The wort outlet 12 is controlled by a gate valve 13, and the hop outlet 14 is controlled by a gate valve 15. The drawn off wort from the filters passes through a pipe 16 controlled by a gate valve 17, and the pipe 16 merges into pipe 12.

The cone shaped bottom 18 fills up with clear wort; after having been filtered through a false bottom 20, the central part 21 of which is stationary and the two adjacent lateral parts 22 of which false bottom 20, are secured each to a bracket 23, secured to a shaft 24 pivotally supported in the frame at the tank at each end of each shaft 24. A protruding end 25 of each shaft 24 is provided with a pinion segment 26, at the exterior of the tank, (Fig. 1), each segment being operated by a worm 27 on a rotatable shaft 28, supported by brackets 28a operated by a hand wheel 29. Each end of the shaft 24 as it protrudes through the tank wall is provided with a stuffing box.

The wort inlet pipe 11 is arranged below the stationary part 21 of the false bottom 20, which pipe 11 extends across the tank its full length, and is provided with two flared slots 11a through the entire length of the pipe 11. These slots are angularly disposed to each other in opposite directions of ejection, in order to distribute the wort and hops uniformly over a lower false bottom 30. This lower false bottom consists also of a stationary central part 31, with two pivoted parts 32 provided with bracket 23 and shaft 24, like those described in connection with the upper false bottom 20, and operated by like mechanism as described in connection with the upper false bottom. Brackets 45 are secured to the interior of the tank and support the false bottom. A stand pipe or gauge tube 52 with valve 51 is connected with the lower end of the cone bottom of the tank.

The orifice 20a of the upper false bottom slot is at the lower surface of the bottom 20 (Fig. 6), and the orifice 30a of the lower false bottom slot is at the upper surface of the bottom 30, (Fig. 7). All of the orifices, either 20a or 30a, are elongated as shown in Fig. 4, and have curved or bevelled surfaces 34, both longitudinally and transversely, acting as enlargements to the slots in the metal false bottoms. These countersunk parts of the false bottoms are, as shown, so arranged that the countersunk part of the lower false bottom is at its lower surface, and the countersunk part of the upper false bottom is at its upper surface. By this arrangement, the hops and wort are confined between the two false bottoms 20 and 30 in the space marked "A."

Below the lower false bottom 30, a cone shaped portion 35 of the tank is provided. This portion 35 fills up with clear wort, and the excess wort then filters through the upper false bottom 20 and fills the compartment "B" which is drawn off to the cooler (not shown) through the pipe 16.

A spray nozzle 38 supplied by a pipe 38a is provided for sparging the hops, this being placed underneath the stationary part 21 adjacent to the distributing pipe 11.

Spray nozzles 39 and 40 supplied by pipes 39a and 40a are provided for cleaning purposes. Instead of one such spray pipe, two or more pipes may be used. Suitable pipes (not shown) supply these spray nozzles. A manhole 40 is provided for cleaning purposes.

Instead of tilting both pivoted parts of each false bottom at one time, each may be separately tilted, by merely cutting the shaft 28 at its central portion and extending the cutoff shaft for the provision of a hand wheel.

The space or compartment formed by the conical bottom is marked "C."

From the foregoing it is noted that the invention includes two false bottoms having slots, the orifices of which face each other so as to provide a compartment between the two false bottoms, each false bottom having a tilting portion or portions. The hops and wort is supplied between these two false bottoms and the excess wort after passing through the upper false bottom is conducted away from the tank.

The wort passing through the lower false bottom is also conducted away from the tank.

The false bottoms are tilted for the removal of the hops and for cleaning at the end of a charge or after a period of operation.

We wish it to be understood that we do not desire to be limited to the exact details of construction shown and described, for obvious modifications will occur to a person skilled in the art.

We claim:

In a hop separator having a tank with vertical walls and an inclined bottom, the combination of a pair of spaced superposed false bottoms transversely across and within the tank, each having a plurality of openings, each false bottom having a stationary horizontal part, and a tiltable horizontal part aligned therewith, said false bottom when the tiltable parts are horizontally disposed dividing the tank into at least three compartments, means exterior to the tank and connected with the false bottoms for tilting the tiltable parts, a wort discharge pipe having its entrance end above the upper false bottom and communicating with the upper compartment for receiving the wort in the upper compartment, a second discharge pipe having its entrance end at the bottom of the tank and communicating with the lowest compartment and with the first wort discharge pipe, and a valve in said second discharge pipe, whereby when said valve is in one position the wort in the tank backs up to the top compartment and discharges into the first discharge pipe, and when the valve is in another position and the tiltable bottoms are tilted, the hops are discharged from the tank.

HANS H. WEISS.
STEVE A. TABACCHI.

REFERENCES CITED

The following references are of record in the file of this patent:

UNITED STATES PATENTS

| Number | Name | Date |
|---|---|---|
| 105,755 | Winchester | July 26, 1870 |
| 436,624 | Andres | Sept. 16, 1890 |
| 1,629,018 | Coberly | May 17, 1927 |
| 1,889,543 | Coors | Nov. 29, 1932 |
| 1,937,757 | Gleason | Dec. 5, 1933 |
| 2,139,924 | Woodruff | Dec. 13, 1938 |
| 2,146,692 | Tiedman | Feb. 7, 1939 |
| 2,312,764 | Lubke | Mar. 2, 1943 |

FOREIGN PATENTS

| Number | Country | Date |
|---|---|---|
| 4,818 | Great Britain | 1896 |